Jan. 13, 1970     A. L. LEMAN     3,489,170

SLUSH PUMP VALVE ASSEMBLY

Filed June 17, 1966

United States Patent Office 3,489,170
Patented Jan. 13, 1970

3,489,170
SLUSH PUMP VALVE ASSEMBLY
Arthur L. Leman, 10340 Wallisville Road,
Houston, Tex. 77029
Filed June 17, 1966, Ser. No. 558,322
Int. Cl. F16k 17/04, 25/00
U.S. Cl. 137—516.29                   5 Claims

ABSTRACT OF THE DISCLOSURE

The nature and general substance of the subject matter claimed, and the nature and gist of the invention asserted, is the provision of a slush pump valve assembly having a valve seat which is readily removable, and thereby quickly and easily renewable, and which combines an inner metal ring and an outer rubber seal, the rubber seal molded with and bonded to the metal ring, and constructed and arranged further to seal the valve, to cushion the impact of the valve in closing against the seat, and to seal the engagement of the valve seat to a pump element or casing on which the valve seat is removably supported.

BACKGROUND OF THE INVENTION

The field of art to which the invention pertains is that of oil well slush pumps, which are in use and operation subjected to extremely high fluid pressures, and to extremely rapid wear from abrasives such as sand and the like.

These conditions dictate such rapid wear of the fluid exposed parts that in high pressure service the steel seating surface of any valve is required to be replaced several times a year.

With the conventional slush pump valves to be found in actual commercial use, the necessary metal or steel seating surface replacement is a most costly and time-consuming process, in that the seating surface is an integral part of the valve seat proper, and in that the valve seat proper has a tapered metal-to-metal fit in the fluid cylinder of the slush pump, and as a result becomes so tightly wedged in the cylinder that it can be removed only by cutting out with a cutting torch.

The conventional valve assemblies having only a metal seat surface are subject also to excessively rapid wear, by the rapid impacts or pounding of the metal valve member, under the high slush pump pressures.

The foregoing problems are solved under this invention by the provision of a valve seat which is readily removable from a supporting pump element, which combines a metal ring and a rubber seal, and which is constructed and arranged by the rubber seal to cushion the shock upon the valve closing, to seal the valve, and to seal also the engagement of the valve seat to the supporting element.

DESCRIPTION OF THE INVENTION

The invention will be fully understood from the following description, taken together with the accompanying drawings illustrating by way of example one embodiment, and in which.

Figure 1:
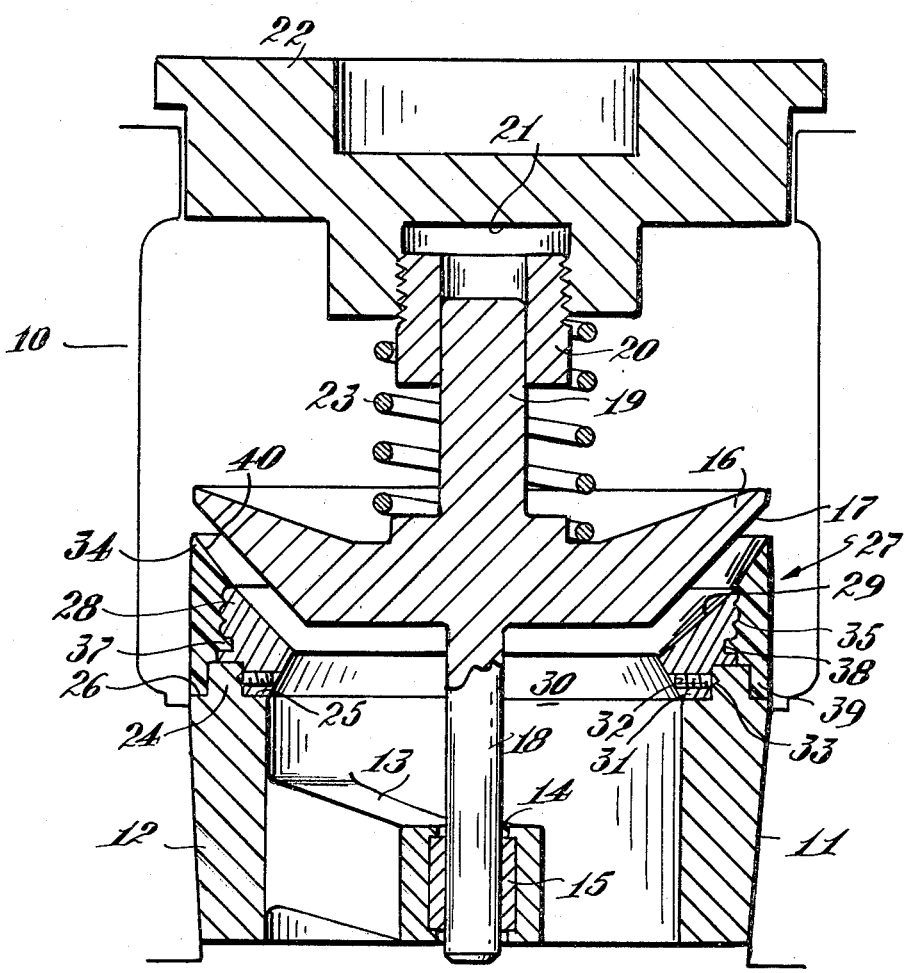
FIG. 1 is a vertical section of the valve assembly in open position.

The slush pump cylinder is conventionally shown in FIG. 1 by the outline 10, and as having an intermediate constriction or deck 11 that tapers downwardly inwardly, and in which is wedgingly fitted or seated a conformantly tapered tubular valve seat supporting member or casing 12. The casing 12 mounts an inwardly projecting arm or spider 13 terminating centrally of the pump cylinder in a guide opening or passage 14 in which is received and held a rubber liner or bushing 15.

A vertically reciprocating, piston-type valve member 16 is disposed in the pump cylinder above the casing 12, and has an annular tapered metal valve seat engaging face 17 defining a seating surface extending from the outer wall of the casing 12 inwardly to a radius smaller than that of, or lying somewhat within, the inner casing wall.

The valve member 16 has a downwardly directed stem 18 received through the casing arm passage 14 and thereby projecting for guiding through the bushing 15, in the vertical reciprocating of said valve member.

The valve member 16 further has an upwardly projecting valve stem 19 having a sliding fit within a bearing ring 20 threaded or otherwise removably received and retained in a suitable recess 21 of a cap member 22 supported as conventionally in the pump cylinder.

The valve member 16 is normally biased to the closed position by a spring 23 received over the stem 19 and compressed as shown between the valve and the cap 22.

The casing 12 is herein formed or provided at its upper end with an intermediate flange or rim 24 defining an inner or infacing step or shoulder 25 and an outer or outfacing step or shoulder 26.

This invention novelly provides a readily removable, and hence quickly and inexpensively renewable, valve seating surface, or valve seat, indicated generally at 27, and comprising an inner metal or steel ring 28 having an upper or valve seating face 29 for engaging, and which tapers conformantly with, the seat engaging face 17 of valve 16.

Inner valve seat ring 28 further has an underface 30 tapering downwardly-outwardly from the lower or inner limit of seating face 29 to convergence or congruence with the inner wall of casing 12, as shown.

The inner metal ring 28 of the valve seat 27 extends outwardly to a circumference intermediate the inner and outer limits of the casing rim 24, and inwardly thereof mounts a downwardly depending flange 31 mating with and seating on the infacing casing shoulder 25.

The separable valve seat 27 is removably secured to the casing 12 by any convenient means, such as the fastening or screw means 32 received through the inner ring 28 and projecting into suitable recesses or indentations 33 in the inner side wall of the casing rim 24, and so preventing the casual lifting, as by pressure or vibration, of the valve seat 27 from its supporting casing member 12.

In accordance with the invention, the separable valve seat 27 comprises further an outer rubber seal ring or sleeve 34 intimately surrounding, and more particularly molded with and thereby bonded to, the inner metal seat ring 28. The outer rubber ring 34 and inner metal ring 28 are under the invention specially formed at their common bonding surface or interface 35 to additionally (to the bonding) resist their relative axial movement, or more particularly the downward sliding of the seal 34 on the ring 28, under compression of the seal 34 by valve 16 in the course of the closing of the valve against seat 27. To that end the interface 35 is extended by, and also roughened by, the forming therein of serrations or sinuosities. The bonding interface 35 is provided further and intermediate its ends with laterally oriented, locking tongue and groove formations 37, 38 which strengthen still further the interface gripping or retaining of the seal 34 against vertical or axial shifting on the ring 28.

The outer rubber seal 34 comprises further a downward extending skirt or lip 39 overlying the end engagement of the ring 28 to the casing 12, and mating with and seated on the outfacing casing shoulder 26, and whereby said skirt 39 both seals the end engagement of the ring 28 to the casing 12, and, by its own end engagement with the casing shoulder 26, limit-stops the rubber seal 34 against the downward sliding on the metal ring 28 to which it is urged as aforesaid by the valve 16.

Figure 2:
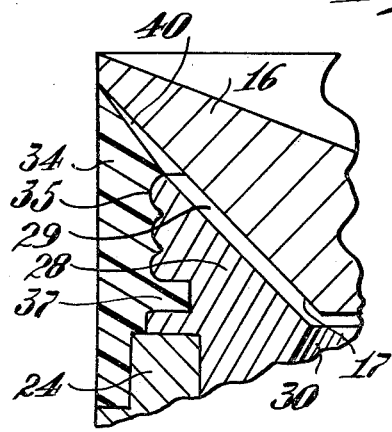
FIG. 2 is a fragmentary vertical section on a larger scale of the FIG. 1 valve assembly with the valve member closed to initial engagement with the rubber seat seal.

In accordance with the invention the seal 34 has a valve-engaging face 40 that tapers at a steeper angle or slope than that of the ring face 29, from an inner edge that is flush or continuous with the outer edge of ring face 29, to an outer edge that is thereby elevated above the extended plane of said face 29, as best seen from FIG. 2.

Figure 3:
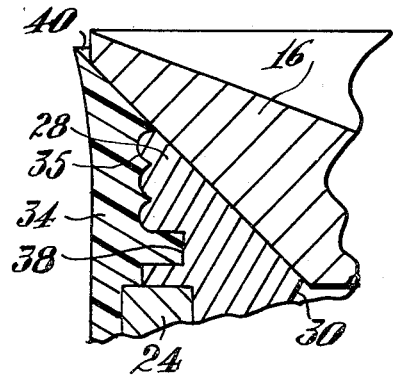
FIG. 3 is a section like FIG. 2 but showing the valve member fully closed against the metal seat ring.

In moving then from the full open position of FIG. 1 to the full closed position of FIG. 3, the valve face 17 first contacts the outer edge of seal face 40 as shown, FIG. 2.

In proceeding from that FIG. 2 position to the fully closed FIG. 3 position the valve 16 will be understood to subject the seal 34 to compressive forces and also to tensile stress, there being, as hereinbefore mentioned, no sliding movement of the outer rubber seal 34 relative to the inner metal ring 28. The stressing or deformation of the seal by the valve seating is indicated in FIG. 3, wherein the seal 34 is shown as forced downwardly and outwardly by the closing of valve face 17 tightly against, or into full metal-to-metal contact with, ring face 29.

From the foregoing it will be appreciated that the valve seat seal 34 of this invention has three distinct functions. Firstly, it cushions the shock or softens the blow upon seating of the valve 16, offering firm and increasing resistance to that by its unitary and end-supported mounting with the seat ring 28. Secondly, the seal 34 seals off the valve, in the closed or seated position, in that, as a result of its downward and outward stressing or deforming as just described, the seal 34 is elastically biased to the valve, resiliently bearing against and maintaining continuous spring pressure on valve seat engaging face 17. Thirdly, the rubber seal 34 is seen to engage and seal around the joint or connection between the seat ring 28 and the supporting casing 12, by its skirt 39 overlying rim 24 and seating under pressure of valve 16 on shoulder 26 of the casing.

Under this invention, then, the sealing off of the metal valve seat is effected by a rubber ring or gasket, as just described, rather than by the conventional tapered metal-to-metal fit. Hence the valve seat hereof is uniquely and freely removable from the slush pump cylinder, for the replacement that is required several times a year by the rapid wear in slush pumps of the steel seating surface, as hereinbefore mentioned. And in contrast to the time-consuming and expensive operation of cutting out the valve seat with a torch, such as is conventionally required, the removal of the valve seat hereof, namely, the ring 28 and with it the seal 34, simply calls for the withdrawing of the fastening 32 from the casing indentations 33. Herein also the replacement of the seal 34 is accompanied by the renewal as well of the steel seating surface 24, in that it is the entire valve seat 27 which is renewed and replaced.

Under this invention also the rate of wear of the steel seating surface is substantially slowed, in that, by its rigid or non-slip engagement with and joining or bonding to the metal seat ring 28, the valve seal 34 hereof more firmly and effectively cushions and softens the shock or impact on the coming down of the valve 16 against the seat 28, under the extremely high fluid pressures obtaining in slush pumps.

I claim:
1. A valve assembly for a slush pump such as subjected in operation to high fluid pressures and rapid abrasive wear comprising, in combination,
   a hollow tubular casing adapted to be seated and supported within the pump,
   an annular valve member, said valve member having an annular uniformly tapered metal seat-engaging face, and
   a replaceable valve seat adapted to be removably supported on said casing, said valve seat comprising
   an inner metal ring engageable to said casing, said ring having a valve-engaging face tapering conformantly with, and dimensioned to engage an inner annulus of, said seat-engaging valve face,
   means removably securing said metal ring to said tubular casing, and
   an outer rubber seal molded around and bonded to said metal ring, said rubber seal having an annular, tapered valve-engaging face, said seal face
   dimensioned to engage an outer annulus of said seat-engaging valve face,
   continuous at its inner edge with the outer edge of said valve-engaging metal ring face, and
   tapering more steeply than said metal ring face from its inner to its outer edge thereby elevated above the extended plane of said metal ring face,
   whereby in the closing of said valve against said seat said metal seat-engaging valve face initially engages said outer edge of said rubber valve-engaging seal face, subsequently presses said seal increasingly downward and outward to bring said valve face into full engagement with said seal face, but without movement of said inner edge of said seal face relative to said metal ring, and finally comes into metal-to-metal engagement with said metal ring face under cushioning and also elastic pressing by said rubber seal.

2. A valve assembly according to claim 1, wherein said rubber seal extends to engage also said casing, and so as to seal the joint between said metal ring and said casing.

3. In a valve assembly according to claim 1,
   an internal shoulder on said casing,
   a mating flange on said metal ring and seated on said shoulder,
   indenting formations in the wall of said casing, and
   fastening members received through said metal ring flange and projecting laterally into said indenting formations to prevent lifting of said metal ring from said casing.

4. In a valve assembly according to claim 1
   an external shoulder on said casing, and
   a mating skirt on said rubber seal, said skirt extending downwardly to overlie the engagement of said metal ring to said casing and to seat on said shoulder, whereby to limit-stop the downward movement of said seal under the compressive force of said valve in closing against said seat.

5. A valve assembly according to claim 1, wherein the interface between the metal ring and the rubber seal of the valve seat is extended, and made resistant to relative axial shifting of said seal and ring, by a plurality of serrations, and by
   a tongue and groove formation whereby upon the closing of said valve against said seat said seal is prevented, by its bonding to said metal ring and as reinforced by said serated, tongue-and-groove interface, from sliding downwardly relative to said metal ring as a result of its subjection to compressive forces and also to tensile stress by said valve member in said closing.

(References on following page)

References Cited

UNITED STATES PATENTS

| | | | |
|---|---|---|---|
| 1,859,590 | 5/1932 | Koppl. | |
| 1,914,737 | 6/1933 | Elms. | |
| 1,948,628 | 2/1934 | Penick et al. | 251—332 |
| 2,197,455 | 4/1940 | Volpin. | |
| 2,485,092 | 10/1949 | Gannon | 251—332 |
| 2,969,951 | 1/1961 | Walton | 251—364 X |
| 2,977,974 | 4/1961 | Browne | 251—333 X |
| 3,063,467 | 11/1962 | Roberts et al. | 137—516.29 |

FOREIGN PATENTS 499,981   2/1939   Great Britain.

WILLIAM F. O'DEA, Primary Examiner

DAVID J. ZOBKIW, Assistant Examiner

U.S. Cl. X.R.

251—363; 277—169